US010978987B2

(12) United States Patent
Hosokawa et al.

(10) Patent No.: US 10,978,987 B2
(45) Date of Patent: Apr. 13, 2021

(54) MOTOR DRIVE DEVICE (71) Applicant: Panasonic Intellectual Property Management Co., Ltd., Osaka (JP)

(72) Inventors: Tomoya Hosokawa, Osaka (JP); Taro Kishibe, Hyogo (JP); Yusuke Shimogaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/613,100

(22) PCT Filed: Apr. 17, 2018

(86) PCT No.: PCT/JP2018/015782
§ 371 (c)(1),
(2) Date: Nov. 12, 2019

(87) PCT Pub. No.: WO2018/211889
PCT Pub. Date: Nov. 22, 2018

(65) Prior Publication Data
US 2020/0099329 A1 Mar. 26, 2020

(30) Foreign Application Priority Data
May 16, 2017 (JP) .............................. JP2017-097340

(51) Int. Cl.
H02P 27/08 (2006.01)
H02P 29/024 (2016.01)

(52) U.S. Cl.
CPC .......... *H02P 29/0241* (2016.02); *H02P 27/08* (2013.01)

(58) Field of Classification Search
CPC .. H02P 29/025; H02P 27/08; H02M 3/33515; H02M 3/3376
See application file for complete search history.

(56) References Cited

U.S. PATENT DOCUMENTS 8,891,210 B2 * 11/2014 Itou .................. H02P 27/06
361/23
9,231,415 B2 * 1/2016 Kainuma .................. H02J 7/00
(Continued)

FOREIGN PATENT DOCUMENTS

EP 0865055 A1 9/1998
EP 2947760 A1 * 11/2015 ............ H02M 5/297
(Continued)

OTHER PUBLICATIONS

International Search Report issued in corresponding International Patent Application No. PCT/JP2018/015782, dated Jun. 26, 2018, with English translation.
(Continued)

*Primary Examiner* — Thai T Dinh
(74) *Attorney, Agent, or Firm* — McDermott Will & Emery LLP (57) ABSTRACT

A motor drive device includes: an inverter circuit; a drive circuit which receives voltage supplied from a control power source; a first cutoff circuit which cuts off voltage supply from the control power source to the drive circuit; a second cutoff circuit connected between the first cutoff circuit and the drive circuit; a voltage detection circuit which detects a detection voltage corresponding to the voltage supplied from the control power source and which is capable of changing the detection voltage; a comparison circuit which, upon determination that the detection voltage is not within a predetermined range, cuts off the first cutoff circuit; and a diagnosis circuit which diagnoses the first cutoff circuit. The diagnosis circuit causes the comparison circuit to cut off the first cutoff circuit, diagnoses the first cutoff circuit, and upon diagnosing the operation of the first cutoff circuit as being abnormal, cuts off the second cutoff circuit.

6 Claims, 4 Drawing Sheets

(56) References Cited

U.S. PATENT DOCUMENTS

| 9,893,674 | B2* | 2/2018 | Ikai | .......................... | H02P 3/22 |
| 2012/0098470 | A1* | 4/2012 | Itou | ........................ | H02P 27/06 |
| | | | | | 318/139 |
| 2017/0250644 | A1* | 8/2017 | Ikai | .......................... | H02P 6/08 |

FOREIGN PATENT DOCUMENTS

| EP | 2947760 A1 | 11/2015 |
| JP | 2013-74679 A | 4/2013 |

OTHER PUBLICATIONS

Extended European Search Report issued in corresponding European Patent Application No. 18803118.1, dated Apr. 9, 2020.

* cited by examiner

MOTOR DRIVE DEVICE

CROSS-REFERENCE OF RELATED APPLICATIONS

This application is the U.S. National Phase under 35 U.S.C. § 371 of International Patent Application No. PCT/JP2018/015782, filed on Apr. 17, 2018, which in turn claims the benefit of Japanese Application No. 2017-097340, filed on May 16, 2017, the entire disclosures of which Applications are incorporated by reference herein.

TECHNICAL FIELD

The present disclosure relates to a motor drive device including an abnormal voltage protection circuit.

BACKGROUND ART

A motor drive device which drives a motor has, in addition to the basic function of driving the motor, the protection function of stopping the motor upon abnormality detection so as not to compromise the safety of the motor and a system loaded with the motor drive device.

Abnormal states include a state in which values of various supply voltages supplied to various circuit blocks of the motor drive device become abnormal. Specifically, the abnormal states include: for example, a state in which the supply voltage exceeds the withstand voltage of a circuit component forming the motor drive device or a state in which the supply voltage falls below the operation guarantee range of the circuit component. Breakdown or malfunction of the circuit component of the motor drive device may occur in such abnormal states, compromising the system safety.

Figure 4:
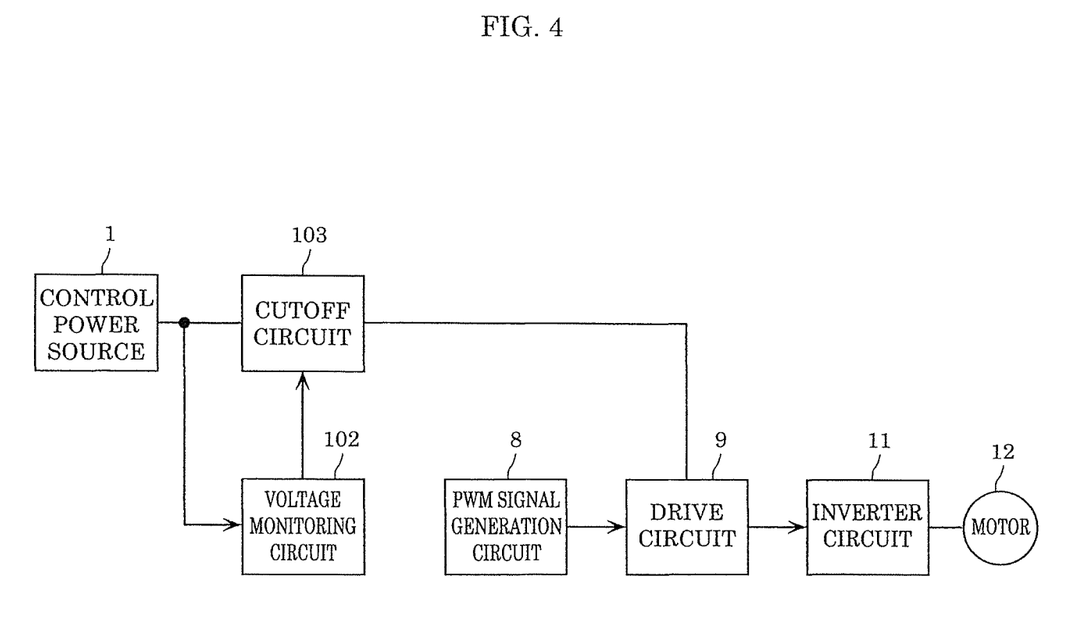
FIG. 4 is a block diagram illustrating one example of a schematic configuration of a conventional motor drive device.

Thus, suggested to prevent the breakdown or the malfunction of the circuit component is a technology of monitoring the supply voltage supplied to each circuit block of the motor drive device and executing predetermined protective operation upon detection of an abnormal voltage such as overvoltage or low voltage (refer to, for example, Patent Literature 1 for overvoltage protection). The motor drive device which executes such protective operation will be described with reference to the drawing. FIG. 4 is a block diagram illustrating one example of a schematic configuration of a conventional motor controller. FIG. 4 illustrates, together with the conventional motor drive device, motor 12 which is driven by the motor drive device.

As illustrated in FIG. 4, the conventional motor drive device includes: control power source 1, voltage monitoring circuit 102, cutoff circuit 103, pulse width modulation (PWM) signal generation circuit 8, drive circuit 9, and inverter circuit 11. A drive signal is supplied from drive circuit 9 to inverter circuit 11 in accordance with a PWM signal outputted from PWM signal generation circuit 8. In response to the supply, inverter circuit 11 supplies power from a DC power source, not illustrated, to a motor winding of motor 12 to thereby drive motor 12.

Voltage monitoring circuit 102 monitors the voltage value of control power source 1 and monitors whether the voltage value is within a predetermined range. When the voltage value of control power source 1 is out of the specified range, voltage monitoring circuit 102 provides a cutoff signal to cutoff circuit 103 to cut off voltage supply to drive circuit 9.

Consequently, output of drive circuit 9 is turned off to achieve emergency stop of motor driving regardless of a command of PWM signal generation circuit 8.

CITATION LIST

Patent Literature

PTL 1: Japanese Unexamined Patent Application Publication No. 2013-74679

SUMMARY OF THE INVENTION

Technical Problem

However, when components of a protection circuit composed of conventional voltage monitoring circuit 102 and cutoff circuit 103 no longer operate normally, the output of drive circuit 9 cannot be turned off even upon excess of the voltage value of control power source 1 over the specified range. Thus, the safety of the motor drive device and also a system loaded with the motor drive device deteriorate.

To solve the problem described above, it is an object of the present disclosure to provide a motor drive device capable of turning off output of a drive circuit to stop a motor even when an abnormal voltage protection circuit no longer operates normally.

Solution to Problem

In order to address the object described above, a motor drive device according to one aspect of the present disclosure includes: an inverter circuit which supplies a power to a motor winding to drive a motor including the motor winding; drive circuit which receives a voltage supplied from a control power source and which provides the inverter circuit with a drive signal; a PWM signal generation circuit which provides the drive circuit with a pulse width modulation (PWM) signal; a first cutoff circuit which cuts off voltage supply from the control power source to the drive circuit; a second cutoff circuit which is connected between the first cutoff circuit and the drive circuit and which cuts off the voltage supply from the control power source to the drive circuit; a voltage detection circuit which detects a detection voltage corresponding to the voltage supplied from the control power source and which is capable of changing the detection voltage; a comparison circuit which determines, through comparison of the detection voltage and a determination threshold, whether the detection voltage is within a predetermined range, and upon determination that the detection voltage is not within the predetermined range, provides the first cutoff circuit with a cutoff signal to cut off the first cutoff circuit; and a diagnosis circuit which diagnoses whether operation of the first cutoff circuit is normal, wherein the diagnosis circuit changes the detection voltage to cause the comparison circuit to cut off the first cutoff circuit, performs diagnosis operation of diagnosing, based on a voltage level between the first cutoff circuit and the second cutoff circuit, whether the operation of the first cutoff circuit is normal, and upon diagnosing the operation of the first cutoff circuit as being abnormal, cuts off the second cutoff circuit.

Advantageous Effect of Invention

A motor drive device can be provided which can turn off output of a drive circuit to stop a motor even when an abnormal voltage protection circuit no longer operates normally.

DESCRIPTION OF EXEMPLARY
EMBODIMENTS

Hereinafter, the embodiments of the present disclosure will be described. Note that each of the embodiments described below illustrates one detailed example of the present disclosure. Therefore, numerical values, components, arrangement positions of the components, connection modes, etc. as well as steps, a sequence of the steps, etc. indicated in the embodiments below form one example and are not intended to limit the present disclosure in any manner. Accordingly, of the components in the embodiments below, those which are not described in an independent claim indicating a superordinate concept will be described as optional components.

Moreover, each of the drawings is a schematic diagram and thus does not necessarily represent exact dimensions. Note that substantially same configurations are provided with same symbols in each of the drawings and overlapping descriptions will be omitted or simplified.

Embodiment 1

Figure 1:
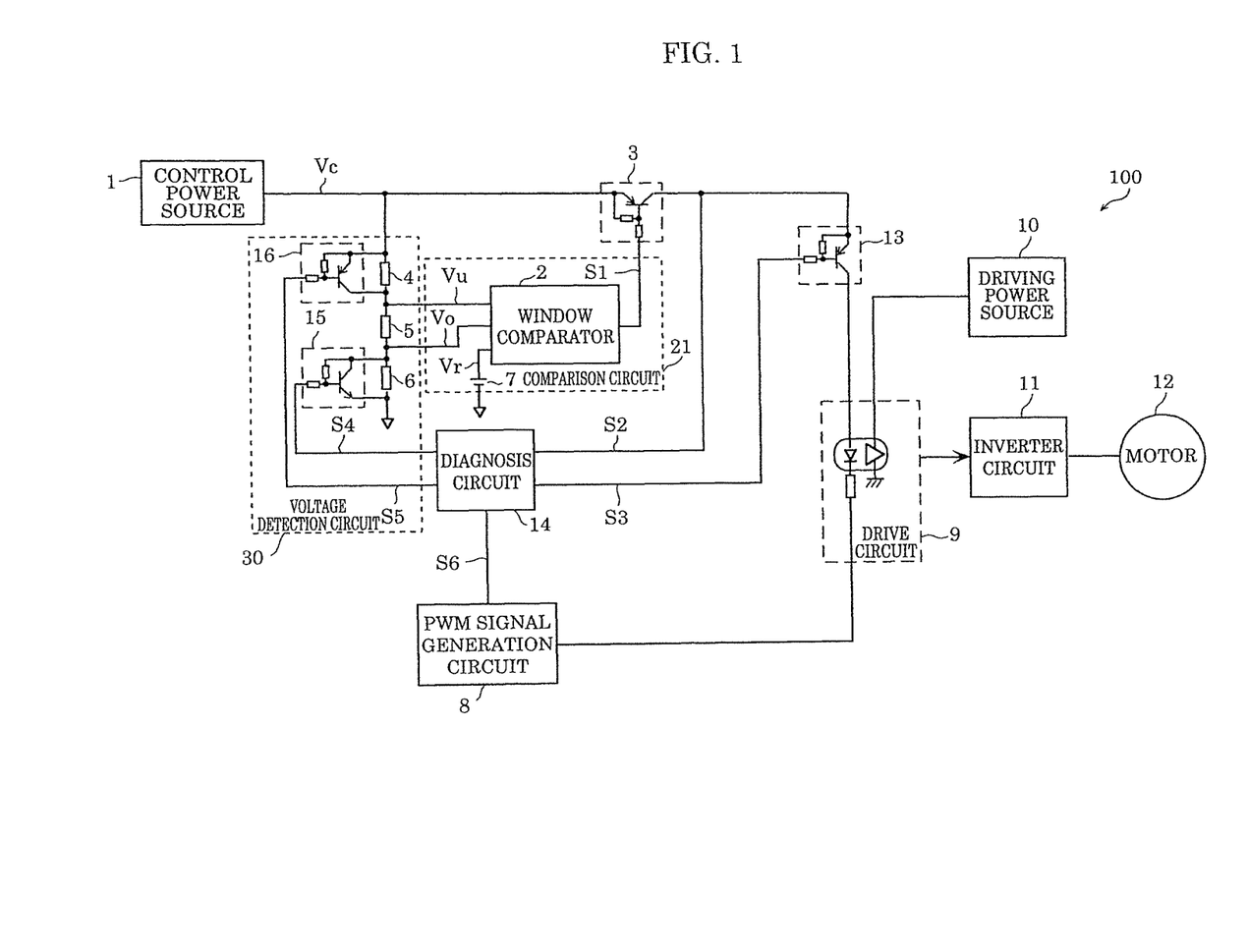
FIG. 1 is a circuit configuration diagram of a motor drive device according to Embodiment 1.

First, a circuit configuration of a motor drive device according to Embodiment 1 will be described with reference to FIG. 1. FIG. 1 is a circuit configuration diagram of motor drive device 100 according to Embodiment 1. FIG. 1 also illustrates motor 12 which is driven by motor drive device 100.

As illustrated in FIG. 1, motor drive device 100 according to Embodiment 1 includes: control power source 1, voltage detection circuit 30, comparison circuit 21, first cutoff circuit 3, second cutoff circuit 13, PWM signal generation circuit 8, drive circuit 9, driving power source 10, inverter circuit 11, and diagnosis circuit 14.

Motor 12 is an AC electric motor which is driven by motor drive device 100. Motor 12 includes a motor winding therein and is driven through power supply to the motor winding by motor drive device 100.

Inverter circuit 11 is a circuit which supplies a power from a DC power source, not illustrated, to the motor winding to drive motor 12 including the motor winding. Inverter circuit 11 has, for example, a plurality of power semiconductor elements which are bridge-connected. A drive signal (gate drive signal) is supplied from drive circuit 9 to each of the plurality of power semiconductor devices included in inverter circuit 11.

Control power source 1 is a supply circuit which supplies a DC voltage to drive circuit 9.

Drive circuit 9 is a circuit which receives a voltage supplied from control power source 1 and which provides the drive signal to inverter circuit 11. Drive circuit 9 mainly has: a photocoupler, an amplifier, and resistance elements. A PWM signal is provided from PWM signal generation circuit 8 to an input side of the photocoupler whereby the PWM signal is outputted from an output side insulated from the input side. The outputted PWM signal is amplified by the amplifier and supplied as the drive signal to inverter circuit 11.

Driving power source 10 is a power source which supplies a power to drive circuit 9. Driving power source 10 supplies the power to, for example, the amplifier of drive circuit 9.

Note that the drive signal is generated for each power semiconductor device of inverter circuit 11, and the photocoupler provided in drive circuit 9 is also provided for each power semiconductor device, which is illustrated in a simplified form in FIG. 1.

A voltage is supplied from control power source 1 to an anode of the photocoupler of drive circuit 9. First cutoff circuit 3 and second cutoff circuit 13 are connected in series between control power source 1 and the anode in order from control power source 1, and a cathode of the photocoupler is connected to PWM signal generation circuit 8 via the resistance element for current limitation.

Drive circuit 9 receives the voltage supplied from control power source 1 via first cutoff circuit 3 and second cutoff circuit 13 and the conducting current of a photodiode is subjected to ON/OFF control in accordance with the PWM signal generated by PWM signal generation circuit 8.

PWM signal generation circuit 8 is a circuit which provides drive circuit 9 with a PWM signal. PWM signal generation circuit 8 generates the PWM signal based on a motor driving control signal inputted from the outside and provides drive circuit 9 with the PWM signal.

First cutoff circuit 3 is a circuit which cuts off the voltage supply from control power source 1 to drive circuit 9. First cutoff circuit 3 switches between a conductive state and a cutoff state in accordance with the level of an input signal provided from comparison circuit 21.

Second cutoff circuit 13 is a circuit which is connected between first cutoff circuit 3 and drive circuit 9 and which cuts off the voltage supply to drive circuit 9. Second cutoff circuit 13 switches between a conductive state and a cutoff state in accordance with the level of an input signal provided from diagnosis circuit 14.

Voltage detection circuit 30 is a circuit which detects a detection voltage corresponding to the voltage supplied from control power source 1 and which is capable of changing the detection voltage. Voltage detection circuit 30 is connected in series between a high potential side electric wire and a low potential side electric wire of control power source 1 and has three resistance elements 4 to 6 which generate two divided voltage values as the detection voltage. Voltage detection circuit 30 further has first switch circuit 15 connected in parallel with resistance element 6 which is included in three resistance elements 4 to 6 and which is connected to the low-potential side electric wire. Voltage detection circuit 30 further has second switch circuit 16 connected in parallel with resistance element 4 which is included in three resistance elements 4 to 6 and which is connected to the high-potential side electric wire.

Three resistance elements 4 to 6 are connected in series in order from the high-potential side electric wire of control power source 1, i.e., resistance element 4, resistance element 5, and resistance element 6. Consequently generated are a divided voltage value Vu and a divided voltage value Vo. The divided voltage value Vu is obtained by dividing a voltage Vc of control power source 1 by resistance element 4 and also by the series combined resistor of resistance element 5 and resistance element 6. The divided voltage value Vo is obtained by dividing the voltage Vc by the series combined resistor of resistance element 4 and resistance element 5 and also by resistance element 6.

Comparison circuit 21 is a circuit which compares the detection voltage detected by voltage detection circuit 30 with a determination threshold to thereby determine whether the detection voltage is within a predetermined range. Upon determination that the detection voltage is not within the predetermined range, comparison circuit 21 provides a cutoff signal to first cutoff circuit 3 to thereby cut off first cutoff circuit 3. Comparison circuit 21 has window comparator 2 and reference power source 7 having a reference voltage Vr and monitors whether the voltage Vc of control power source 1 is within the predetermined range.

Window comparator 2 receives input of the divided voltage values Vu and Vo. Window comparator 2 also receives input of the reference voltage Vr from reference power source 7 to compare the divided voltage values Vu and Vo with the reference voltage Vr.

Here, a change in the voltage Vc results in changes in the divided voltage values Vu and Vo, thus permitting judgment on whether the voltage Vc falls within the specified range.

For example, in either of a case where the divided voltage value Vu is less than or equal to the reference voltage Vr (it has been detected that the voltage Vc of control power source is less than or equal to the lower limit) and a case where the divided voltage value Vo is greater than or equal to the reference voltage Vr (it has been detected that the voltage Vc of control power source is greater than or equal to the upper limit), window comparator 2 operates in a manner such that outputted signal S1 is set at an H (high) level. On the other hand, in other cases (where it has been detected that the voltage Vc of the control power source is within the predetermined range), window comparator 2 operates to set signal S1 at an L (Low) level.

Upon receiving input of signal S1 at an L level, first cutoff circuit 3 operates to turn into a conductive state, and upon receiving input of signal S1 at an H level, first cutoff circuit 3 operates to turn into a cutoff state. That is, first cutoff circuit 3 turns its state into a cutoff state when signal S1 outputted by window comparator 2 is at an H level (a case where the voltage Vc of the control power source is not within the predetermined range). First cutoff circuit 3 turns its state into a conductive state when signal S1 is at an L level (a case where the voltage Vc of the control power source is within the predetermined range). Therefore, cutoff operation of control power source 1 as protection taken for abnormal voltage is realized in motor drive device 100.

Diagnosis circuit 14 is a circuit which diagnoses whether operation of first cutoff circuit 3 is normal.

Diagnosis circuit 14 monitors voltage level S2 on an output side of first cutoff circuit 3. It is recognized that voltage level S2 is at an H level when first cutoff circuit 3 is in a conductive state while voltage level S2 is at an L level when first cutoff circuit 3 is in a cutoff state.

Moreover, diagnosis circuit 14 provides second cutoff circuit 13 with signal S3 to control conduction and cutoff of second cutoff circuit 13. Here, second cutoff circuit 13 operates to turn into a cutoff state when signal S3 is at an L level and turn into a conductive state when signal S3 is at an H level.

Moreover, diagnosis circuit 14 provides first switch circuit 15 and second switch circuit 16 with signals S4 and S5, respectively, to control conduction and cutoff of first switch circuit 15 and second switch circuit 16. Here, first switch circuit 15 is conducted by setting signal S4 at an H level and second switch circuit 16 is conducted by setting signal S5 at an L level.

Here, first switch circuit 15 is connected in a manner such that both side electrodes of resistance element 6 are shorted and second switch circuit 16 is connected in a manner such that both side electrodes of resistance element 4 are shorted. When first switch circuit 15 has been conducted (the both side electrodes of resistance element 6 are shorted), the divided voltage value Vu turns into a value obtained by dividing the voltage Vc by resistance element 4 and resistance element 5, and the values of resistance elements 4 to 6 are adjusted in a manner such that the divided voltage value Vu at that time becomes less than or equal to the reference voltage Vr. Moreover, when second switch circuit 16 has been conducted (the both side electrodes of resistance element 4 are shorted), the divided voltage value Vo turns into a value obtained by dividing the voltage Vc by resistance element 5 and resistance element 6, and the values of resistance elements 4 to 6 are adjusted in a manner such that the divided voltage value Vo at that time becomes greater than or equal to the reference voltage Yr.

Such a configuration permits diagnosis circuit 14 to simulate upper limit voltage detection operation (operation of detecting that the voltage Vc of control power source 1 is greater than or equal to the upper limit) and low voltage detection operation (operation of detecting that the voltage Vc of control power source 1 is less than or equal to the lower limit). Consequently, the conduction and the cutoff of first cutoff circuit 3 can be performed on a trial basis. It can also be diagnosed, through logical comparison of the levels of signals S4 and S5 and voltage level S2 on the output side of first cutoff circuit 3, whether first cutoff circuit 3 operates normally.

As described above, diagnosis circuit 14 changes the detection voltage to thereby cause comparison circuit 21 to cut off first cutoff circuit 3, and performs, based on the voltage level between first cutoff circuit 3 and second cutoff circuit 13, diagnosis operation of diagnosing whether the operation of first cutoff circuit 3 is normal. Diagnosis circuit 14 cuts off second cutoff circuit 13 upon diagnosing the operation of first cutoff circuit 8 as being abnormal.

Next, the diagnosis operation performed by diagnosis circuit 14 will be described.

Figure 2:
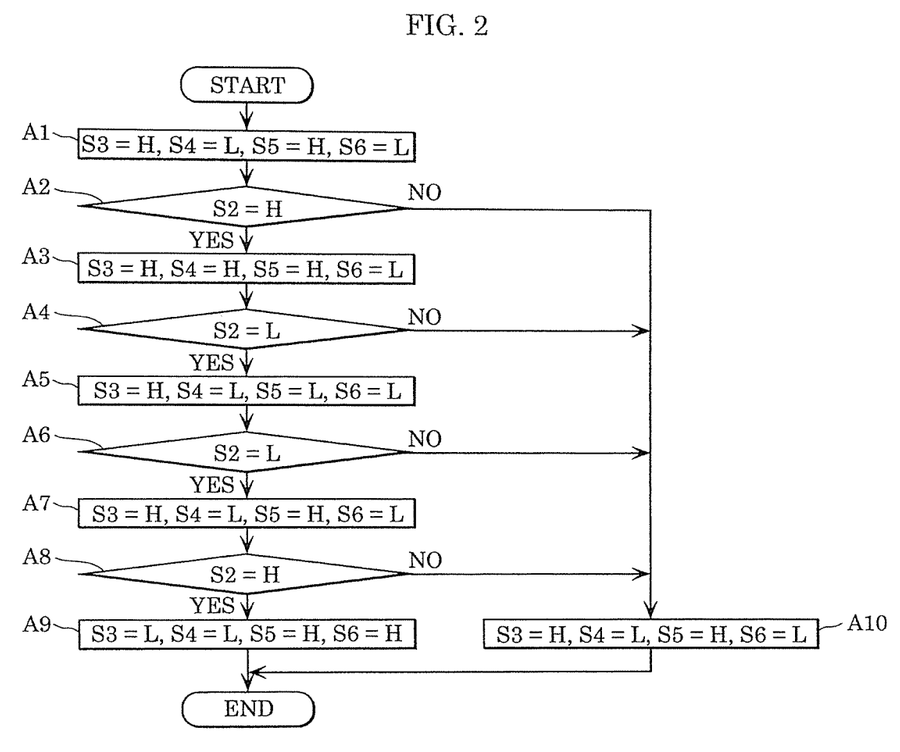
FIG. 2 is an operation flowchart of Embodiment 1.

FIG. 2 is a flowchart illustrating a flow of operation performed by motor drive device 100 according to Embodiment 1.

First, upon supply of control power source 1, diagnosis of the operation of first cutoff circuit 3 is started by diagnosis circuit 14, and diagnosis circuit 14 sets signal S3 at an H level, signal S4 at an L level, signal S5 at an H level, and signal S6 at an L level (Step A1). That is, first switch circuit 15 and second switch circuit 16 turn into a cutoff state and second cutoff circuit 13 turns into a conductive state.

Here, signal S6 is a signal which indicates a PWM signal output permission flag provided to PWM signal generation circuit 8. PWM signal generation circuit 8 is set to prohibit the output when signal S6 is at an L level and permit the output when signal S6 is at an H level.

Next, diagnosis circuit 14 detects voltage level S2 and determines whether voltage level S2 is at an H level (step A2).

When voltage level S2 is at the H level (YES in step A2), diagnosis circuit 14 determines that comparison circuit 21 and first cutoff circuit 3 normally operate and the voltage Vc is normally supplied from control power source 1, proceeding to next step A3.

Next, diagnosis circuit 14 sets signal S3 at an H level, signal S4 at an H level, signal S5 at an H level, and signal S6 at an L level (step A3). The setting corresponds to a case where the voltage Vc of control power source 1 has become equal or less than the lower limit of the predetermined range.

Next, diagnosis circuit 14 detects voltage level S2 and determines whether the voltage level is at an L level (step A4).

When voltage level S2 is at the L level (YES in step A4), diagnosis circuit 14 determines that comparison circuit 21 and first cutoff circuit 3 have operated normally, proceeding to the next step A5.

Next, diagnosis circuit 14 sets signal S3 at an H level, signal S4 at an L level, signal S5 at an L level, and signal S6 at an L level (step A5). The setting corresponds to a case where the voltage Vc of control power source 1 has become greater than or equal to the upper limit of the predetermined range.

Next, diagnosis circuit 14 detects voltage level S2 and determines whether the voltage level is at an L level (step A6). When signal S2 is at the L level (YES in step A6), diagnosis circuit 14 determines that comparison circuit 21 and first cutoff circuit 3 have operated normally, proceeding to next step A7.

Next, diagnosis circuit 14 sets signal S3 at an H level, signal S4 at an L level, signal S5 at an H level, and signal S6 at an L level (step A7). The setting corresponds to a case where the voltage Vc of control power source 1 is supplied as usual.

Next, diagnosis circuit 14 detects the voltage level of voltage level S2 and determines whether the voltage level is at an H level (step A8). When voltage level S2 is at the H level (YES in step A8), diagnosis circuit 14 determines that comparison circuit 21 and first cutoff circuit 3 operate normally and the voltage Vc is normally supplied from control power source 1, proceeding to next step A9.

In step A9, diagnosis circuit 14 determines that comparison circuit 21 and first cutoff circuit 3 are normal and fixes signal S3 at an L level, signal S4 at an L level, signal S5 at an H level, and signal S6 at an H level, ending the diagnosis operation.

Since voltage level S2 is at the H level here, first cutoff circuit 3 is in a conductive state. Since signal S3 is at the L level, the second cutoff circuit 13 is in a conductive state. Since signal S6 is at the H level, PWM signal generation circuit 8 is permitted to operate.

Therefore, drive circuit 9 is operated by the signal of PWM signal generation circuit 8, thereby starting motor activation.

On the other hand, upon determination in each of steps A2, A4, A6, and A8 that voltage level S2 is not at the defined level (NO in steps A2, A4, A6, and A8), diagnosis circuit 14 determines that abnormality is occurring in at least one of comparison circuit 21 and first cutoff circuit 3 and sets signal S3 at an H level, signal S4 at an L level, signal S5 at an H level, and signal S6 at an L level (step A10).

Since signal S3 is at the H level here, second cutoff circuit 13 is being cut off. Since signal S6 is at the L level, PWM signal generation circuit 8 is not permitted to operate.

Therefore, the output of drive circuit 9 is fixed at OFF, and thus the activation of motor 12 is not performed. Diagnosis circuit 14 may notify that abnormality in a host device, not illustrated, loaded in motor drive device 100 has been detected.

As described above, according to Embodiment 1, the diagnosis operation of diagnosing whether first cutoff circuit 3 controlled by comparison circuit 21 operates normally can be performed. Upon diagnosing the operation of first cutoff circuit 3 as being not normal in the diagnosis operation, the voltage supply to drive circuit 9 is reliably cut off by second cutoff circuit 13 controlled by diagnosis circuit 14, which can reliably turn off the output of drive circuit 9. Thus, a motor drive device can be realized which can turn off the output of drive circuit 9 to stop the motor even when the abnormal voltage protection circuit composed of first cutoff circuit 3, etc. no longer operates normally. Moreover, the safety of the system including motor 12 can be improved.

Moreover, the diagnosis operation can be performed in a state in which the voltage supply to drive circuit 9 is cut off, thus permitting execution of safe diagnosis operation even when control power source is in an abnormal voltage state such as overvoltage or low voltage during the diagnosis.

Moreover, when control power source 1 is turned on, motor drive device 100 may perform the diagnosis operation, may determine an operation mode defined by the result of the aforementioned diagnosis, and then may hold the determined operation mode until control power source 1 of motor drive device 100 is turned off. Consequently, the occurrence of misdiagnosis influenced by switching noise can be reduced.

Moreover, the diagnosis operation may be executed every time control power source 1 is turned ON. Consequently, it can frequently be diagnosed whether comparison circuit 21 and first cutoff circuit 3 controlled by comparison circuit 21 operate normally, which can more improve the safety.

Note that the description refers to the diagnosis operation performed when control power source 1 is turned on but the following diagnosis operation can also be performed.

Specifically, when no power is supplied to the motor winding while control power source 1 of motor drive device 100 is turned on and the PWM signal is turned off (that is, when motor 12 is in a standby state), the voltage supply to drive circuit 9 is not required, and thus first cutoff circuit 3 and second cutoff circuit 13 may be conducted and cut off. Therefore, it is possible for motor 12 to execute the same diagnosis operation as that in the operation flow of FIG. 2 when motor 12 is in a standby state.

Note that motor drive device 100 may include a timer so that the operation can be performed at predefined time intervals, for example, an operation mode is determined after the execution of the diagnosis operation and the operation mode is held until the next diagnosis operation. Consequently, the diagnosis operation can be executed on a regular basis.

Here, when the timer has been provided with a motor standby command from the host device, a count value is reset and counting is started. On the other hand, when the timer has been provided with a motor driving command from the host device, the count value is reset and the counting is stopped.

Note that when motor drive device 100 has been provided with the motor driving command during the execution of the diagnosis operation, motor drive device 100 executes the same diagnosis operation as the diagnosis operation in the operation flow illustrated in FIG. 2 and starts the driving of motor 12 when it has been diagnosed that the operation is normal.

As described above, the diagnosis operation can be performed on a regular basis not only when control power source 1 of motor drive device 100 is turned on but also while motor 12 is on standby, which can more improve the safety of the system loaded with motor drive device 100.

Summarizing the above, motor drive device 100 according to Embodiment 1 includes: inverter circuit 11 which supplies a power to the motor winding to drive motor 12 including the motor winding; and drive circuit 9 which receives a voltage supplied from control power source 1 and provides a drive signal to inverter circuit 11. Motor drive device 100 further includes: PWM signal generation circuit 8 which provides drive circuit 9 with a PWM signal; first cutoff circuit 3 which cuts off the voltage supply from control power source 1 to drive circuit 9; and second cutoff circuit 13 which is connected between first cutoff circuit 3 and drive circuit 9 and which cuts off the voltage supply from control power source 1 to drive circuit 9. Motor drive device 100 further includes voltage detection circuit 30 which can detect the detection voltage corresponding to the voltage supplied from control power source 1 and also can change the detection voltage. Motor drive device 100 further includes: comparison circuit 21 which compares the detection voltage with the determination threshold to thereby determine whether the detection voltage is within the predetermined range and, upon determination that the detection voltage is not within the predetermined range, provides a cutoff signal to first cutoff circuit 3 to thereby cut off first cutoff circuit 3; and diagnosis circuit 14 which diagnoses whether the operation of first cutoff circuit 3 is normal. Diagnosis circuit 14 changes the detection voltage to thereby cause comparison circuit 21 to cut off first cutoff circuit 3 and performs, based on the voltage level between first cutoff circuit 3 and second cutoff circuit 13, the diagnosis operation of diagnosing whether the operation of first cutoff circuit 3 is normal, and upon diagnosing the operation of first cutoff circuit 3 as being abnormal, cuts off second cutoff circuit 13.

Consequently, comparison circuit 21 can be activated on a trial basis to perform the diagnosis operation of diagnosing whether first cutoff circuit 3 controlled by comparison circuit 21 operates normally. Moreover, upon diagnosing the result of the diagnosis as being not normal, the voltage supply to drive circuit 9 is reliably cut off by second cutoff circuit 13, turning off the output of drive circuit 9. Thus, motor drive device 100 can be realized which can turn off the output of drive circuit 9 to stop the motor even when the abnormal voltage protection circuit composed of, for example, first cutoff circuit 3 no longer operates normally. In addition, the safety of the system loaded with motor drive device 100 can be improved.

Moreover, voltage detection circuit 30 in motor drive device 100 may have: three resistance elements 4, 5, and 6 which are connected in series between the high-potential side electric wire and the low potential side electric wire of control power source 1 and which generate the two divided voltage values as the detection voltage; first switch circuit 15 connected in parallel with resistance element 6 which is included in three resistance elements 4, 5, and 6 and which is connected to the low potential side electric wire; and second switch circuit 16 connected in parallel with the resistance element which is included in the three resistance elements and which is connected to the high potential side electric wire. Diagnosis circuit 14 may provide voltage detection circuit 30 with: a first diagnostic signal for cutting off first switch circuit 15 and also cutting off second switch circuit 16; a second diagnostic signal for conducting first switch circuit 15 and cutting off second switch circuit 16; and a third diagnostic signal for cutting off first switch circuit 15 and conducting second switch circuit 16 to change the detection voltage.

Consequently, the detection voltage of voltage detection circuit 30 can be changed on a trial basis only by providing the two switch circuits and conducting and cutting off the two, and thus a circuit including diagnosis circuit 14 can relatively easily be formed.

Moreover, diagnosis circuit 14 in motor drive device 100 may diagnose the operation of first cutoff circuit 3 as being normal and may operate to conduct second cutoff circuit 13 when a first condition, a second condition, and a third condition are satisfied. The first condition is that the voltage level between first cutoff circuit 3 and second cutoff circuit 13 is at a high level when the first diagnostic signal has been provided. The second condition is that the voltage level between first cutoff circuit 3 and second cutoff circuit 13 is at a low level when the second diagnostic signal has been provided. The third condition is that the voltage level between first cutoff circuit 3 and second cutoff circuit 13 is at a low level when the third diagnostic signal has been provided. Diagnosis circuit 14 may diagnose the operation of first cutoff circuit 3 as being abnormal and may cut off second cutoff circuit 13 when at least one of the first condition, the second condition, and third condition is not satisfied.

Consequently, diagnosis circuit 14 operates to perform the diagnosis operation for a plurality of patterns, thus permitting reliable detection whether first cutoff circuit 3 is normal.

Moreover, diagnosis circuit 14 may perform the diagnosis operation while second cutoff circuit 13 is cut off in motor drive device 100.

Consequently, the diagnosis operation can be performed by second cutoff circuit 13 while the voltage supply to drive circuit 9 is cut off. Therefore, the diagnosis operation can safely be executed even in an abnormal voltage state such as overvoltage or low voltage during the diagnosis.

Moreover, diagnosis circuit 14 may perform the diagnosis operation when control power source 1 is turned on in motor drive device 100.

Consequently, diagnosis circuit 14 performs the diagnosis operation when control power source 1 of motor drive device 100 is turned on. Therefore, compared to a case where the diagnosis operation is performed on a regular basis during the motor driving, the occurrence of misdiagnosis caused under the influence of switching noise can be reduced. Moreover, the diagnosis operation can be executed on a regular basis every time control power source 1 of motor drive device 100 is turned on, which can improve the safety of the system loaded with motor drive device 100.

Moreover, diagnosis circuit 14 in motor drive device 100 may perform the diagnosis operation when no power is supplied to the motor winding as a result of turning off the PWM signal.

As described above, when motor 12 is in a standby state, that is, when the voltage supply to drive circuit 9 is not required, first cutoff circuit 3 and second cutoff circuit 13 may be conducted and cutoff, permitting the execution of the diagnosis operation. Therefore, not only when control power source 1 of motor drive device 100 is turned on, but also by executing the diagnosis operation on a regular basis while the motor is on standby, the safety of the system loaded with the motor drive device can be improved.

Embodiment 2

Figure 3:
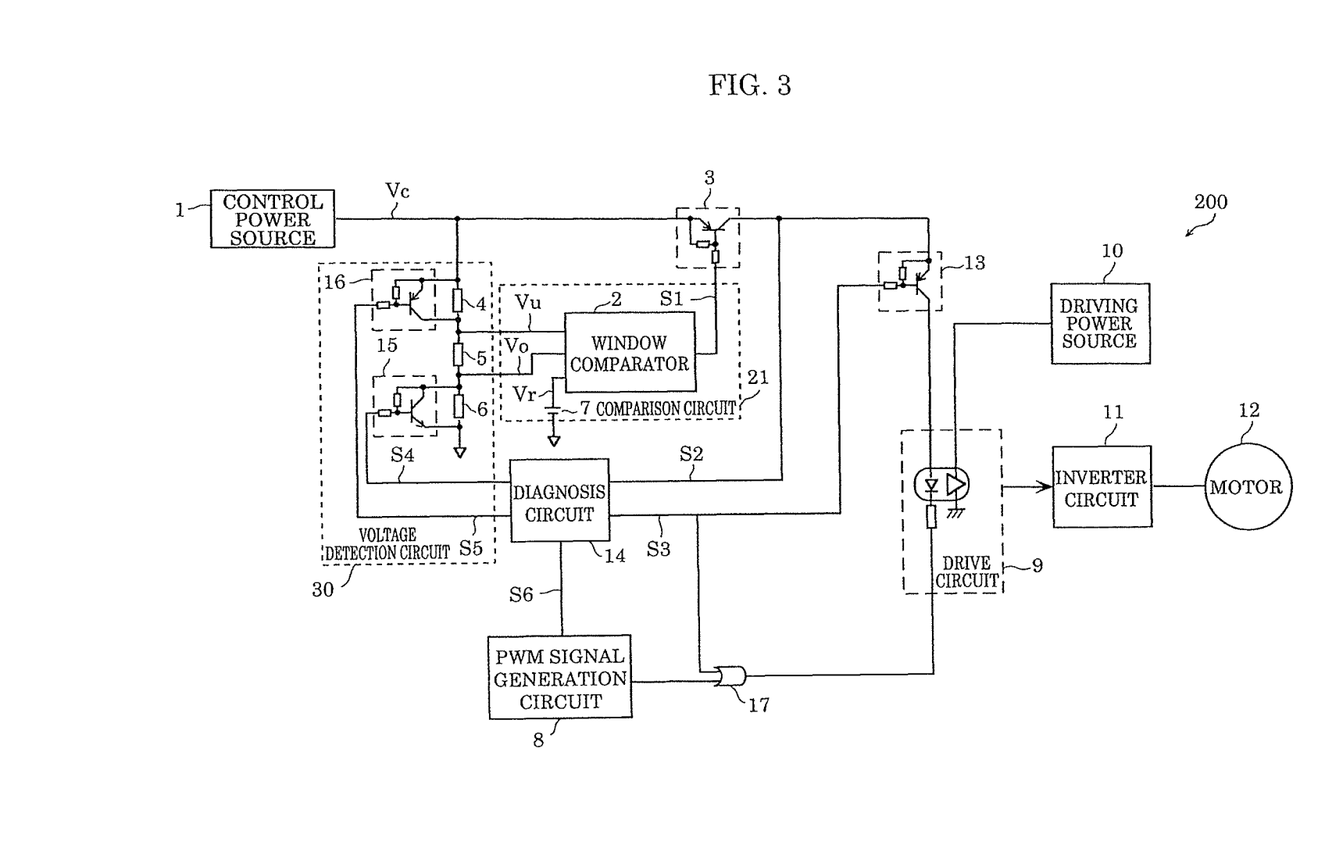
FIG. 3 is a circuit configuration diagram of a motor drive device according to Embodiment 2.

A circuit configuration of a motor drive device according to Embodiment 2 will be described with reference to FIG. 3. FIG. 3 is a circuit configuration diagram of motor drive device 200 according to Embodiment 2. As is the case with FIG. 1, FIG. 3 also illustrates motor 12 which is driven by motor drive device 200.

Same portions in FIG. 3 as those in the circuit configuration diagram of motor drive device 100 according to Embodiment 1 are indicated by the same symbols, and the description thereof will be omitted.

Moreover, the operation of diagnosis circuit 14 of Embodiment 2 is identical to that in the operation flowchart of motor drive device 100 according to Embodiment 1 illustrated in FIG. 2 and thus the description thereof will be omitted.

Embodiment 2 differs from Embodiment 1 in an additional configuration such that signal S3 provided by diagnosis circuit 14 and a PWM signal provided from PWM signal generation circuit 8 are inputs of AND circuit 17 and outputs thereof are connected to an anode side of the photodiode of drive circuit 9.

Specifically, upon abnormality detection through the diagnosis operation by diagnosis circuit 14, signal S3 is set at an H level, and thus AND circuit 17 can cut off the output of the PWM signal outputted from PWM signal generation circuit 8 to fix the output of drive circuit 9 at OFF.

According to Embodiment 2, upon the abnormality detection through the diagnosis operation, the output of drive circuit 9 can be turned off by two different techniques including cutoff of control power source 1 by second cutoff circuit 13 and cutoff of the signal provided from PWM signal generation circuit 8. Therefore, the safety can be more improved than the safety provided by the technique using only second cutoff circuit 13 as is the case with Embodiment 1.

Note that same portions as those of Embodiment 1 can provide same contents and same effects as those described in Embodiment 1.

Moreover, AND circuit 17 is used in Embodiment 2, but a different logic circuit may be used to realize the same operation.

Summarizing the above, motor drive device 200 includes, in addition to motor drive device 100 according to Embodiment 1, a logic circuit which cuts off the PWM signal, and when the result of the diagnosis is abnormal, diagnosis circuit 14 cuts off second cutoff circuit 13 and causes the logic circuit to cut off the PWM signal.

Consequently, upon diagnosing the operation of first cutoff circuit 3 as being not normal by diagnosis circuit 14, the voltage supply to drive circuit 9 can reliably be cutoff by second cutoff circuit 13 and also the PWM signal to be provided to drive circuit 9 can simultaneously be cut off.

Therefore, the output of drive circuit 9 is turned off simultaneously by the two different cutoff methods, which can therefore more improve the safety of the system loaded with motor drive device 200.

Variation and Others

The motor drive devices according to the present disclosure have been described above based on the embodiments, but the present disclosure is not limited to each of the embodiments described above.

For example, the motor drive device according to each of the embodiments described above includes control power source 1, but control power source 1 may not be included in the motor drive device itself.

The present disclosure also includes: a mode obtained by providing each of the embodiments with various modifications conceived by those skilled in the art and a mode realized by combining the components and the functions of each of the embodiments in a desired manner within a range not departing from the spirits of the present disclosure.

INDUSTRIAL APPLICABILITY

The motor drive devices of the present disclosure include the comparison circuit which monitors the voltage of the control power source and the diagnosis circuit which judges whether it is normal to thereby improve the reliability of the abnormal voltage protection, and is thus useful for a motor drive device loaded in various devices which require safety.

The invention claimed is:

1. A motor drive device, comprising:
   an inverter circuit which supplies a power to a motor winding to drive a motor including the motor winding;
   a drive circuit which receives a voltage supplied from a control power source and which provides the inverter circuit with a drive signal;
   a pulse width modulation (PWM) signal generation circuit which provides the drive circuit with a PWM signal;
   a first cutoff circuit which cuts off voltage supply from the control power source to the drive circuit;
   a second cutoff circuit which is connected between the first cutoff circuit and the drive circuit and which cuts off the voltage supply from the control power source to the drive circuit;
   a voltage detection circuit which detects a detection voltage corresponding to the voltage supplied from the control power source;
   a comparison circuit which determines, through comparison of the detection voltage and a determination threshold, whether the detection voltage is within a predetermined range, and upon determination that the detection voltage is not within the predetermined range, provides the first cutoff circuit with a cutoff signal to cut off the first cutoff circuit; and
   a diagnosis circuit which diagnoses whether operation of the first cutoff circuit is normal, wherein
   the diagnosis circuit changes a correspondence relationship between the voltage supplied from the control power source and the detection voltage to cause the comparison circuit to cut off the first cutoff circuit, performs diagnosis operation of diagnosing, based on a voltage level between the first cutoff circuit and the second cutoff circuit, whether the operation of the first cutoff circuit is normal, and upon diagnosing the operation of the first cutoff circuit as being abnormal, cuts off the second cutoff circuit,
   the voltage detection circuit includes:
     three resistance elements which are connected in series between a high potential side electric wire and a low potential side electric wire of the control power source and which generates two divided voltage values as the detection voltage;
     a first switch circuit connected in parallel with the resistance element which is included in the three resistance elements and which is connected to the low potential side electric wire; and
     a second switch circuit connected in parallel with the resistance element which is included in the three resistance elements and which is connected to the high potential side electric wire, and
   the diagnosis circuit changes the detection voltage by providing the voltage detection circuit with: a first diagnostic signal for cutting off the first switch circuit and cutting off the second switch circuit a second diagnostic signal for conducting the first switch circuit and cutting off the second switch circuit and a third diagnostic signal for cutting off the first switch circuit and conducting the second switch circuit.

2. The motor drive device according to claim 1, further comprising a logic circuit which cuts off the PWM signal, wherein when a result of the diagnosis is abnormal, the diagnosis circuit cuts off the second cutoff circuit and causes the logic circuit to cut off the PWM signal.

3. The motor drive device according to claim 1, wherein
the diagnosis circuit diagnoses the operation of the first cutoff circuit as being normal and operates to conduct the second cutoff circuit when a first condition, a second condition, and a third condition are satisfied, the first condition being that the voltage level between the first cutoff circuit and the second cutoff circuit is at a high level when the first diagnostic signal has been provided, the second condition being that the voltage level between the first cutoff circuit and the second cutoff circuit is at a low level when the second diagnostic signal has been provided, the third condition being that the voltage level between the first cutoff circuit and the second cutoff circuit is at a low level when the third diagnostic signal has been provided, and
when at least one of the first condition, the second condition, or the third condition is not satisfied, the diagnosis circuit diagnoses the operation of the first cutoff circuit as being abnormal and cuts off the second cutoff circuit.

4. The motor drive device according to claim 1, wherein the diagnosis circuit performs the diagnosis operation in a state in which the second cutoff circuit is cut off.

5. The motor drive device according to claim 1, wherein the diagnosis circuit performs the diagnosis operation when the control power source is turned on.

6. The motor drive device according to claim 1, wherein the diagnosis circuit performs the diagnosis operation when no power is supplied to the motor winding as a result of turning off the PWM signal.

* * * * *